United States Patent
Mao

(10) Patent No.: US 9,942,376 B2
(45) Date of Patent: Apr. 10, 2018

(54) MOBILE DEVICE COMPRISING MULTIPLE SENSORS FOR CONTROLLING FUNCTIONAL OPERATIONS

(71) Applicant: BOE TECHNOLOGY GROUP CO., LTD., Beijing (CN)

(72) Inventor: Defeng Mao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/115,059

(22) PCT Filed: Jan. 29, 2016

(86) PCT No.: PCT/CN2016/072821
§ 371 (c)(1),
(2) Date: Jul. 28, 2016

(87) PCT Pub. No.: WO2017/012333
PCT Pub. Date: Jan. 26, 2017

(65) Prior Publication Data
US 2017/0111492 A1 Apr. 20, 2017

(30) Foreign Application Priority Data
Jul. 21, 2015 (CN) .......................... 2015 1 0432436

(51) Int. Cl.
*H04M 1/725* (2006.01)

(52) U.S. Cl.
CPC .... *H04M 1/72519* (2013.01); *H04M 2250/12* (2013.01); *H04M 2250/22* (2013.01)

(58) Field of Classification Search
CPC ....... H04W 4/001; H04W 4/02; H04W 4/003; H04W 52/0254; H04W 52/027;
(Continued)

(56) References Cited

U.S. PATENT DOCUMENTS 6,617,845 B1 * 9/2003 Shafiyan-Rad ...... G01D 11/245
324/207.16
8,422,994 B2 * 4/2013 Rhoads .................. G01C 21/20
455/411
(Continued)

FOREIGN PATENT DOCUMENTS

CN 101800790 A 8/2010
CN 102306132 A 1/2012
(Continued)

OTHER PUBLICATIONS

Search Report and Written Opinion dated Mar. 24, 2016 from State Intellectual Property Office of the P.R. China.
Second Office Action dated Feb. 9, 2018.

*Primary Examiner* — Meless Zewdu
(74) *Attorney, Agent, or Firm* — Dilworth & Barrese, LLP.; Michael J. Musella

(57) ABSTRACT

A mobile device and a control method thereof are provided. The mobile device including a detecting module (1), a determining module (2), a controlling module (3) and a storing module (4). The storing module (4) is configured for pre-storing reference data for a plurality of characteristic parameters, wherein the reference data for each of the characteristic parameters indicate types of substances, respectively; the detecting module (1) is configured for detecting one of the characteristic parameters of a substance in contact with the functional body of the mobile device so as to obtain a detection data for the one of the characteristic parameters; the determining module (2) is configured for comparing the detection data for the one of the characteristic parameters obtained by the detecting module with the reference data for the corresponding characteristic parameters pre-stored in the storing module (4), so as to determine a type of the substance in contact with the functional body of the mobile device; the controlling module (3) is configured (Continued)

for controlling the functional body of the mobile device to activate a corresponding working mode according to the type of the substance determined by the determining module. Thus, not only the mobile device can be protected from accidental damage, but also the user is enabled to enjoy more intelligent services of the mobile device.

14 Claims, 2 Drawing Sheets

(58) Field of Classification Search
CPC ......... H04W 52/0267; H04W 52/0274; H04W 92/08; H04W 52/0258; H04W 52/288; H04W 12/08; H04M 1/72522; H04M 2250/12; H04M 2250/22; H04M 1/72519; H04M 1/725; H04M 2250/00
See application file for complete search history.

(56) References Cited

U.S. PATENT DOCUMENTS

| | | | | |
|---|---|---|---|---|
| 2002/0175814 | A1* | 11/2002 | Wadlow | G01D 5/24 340/562 |
| 2012/0310587 | A1* | 12/2012 | Tu | G01D 1/16 702/141 |
| 2013/0002531 | A1* | 1/2013 | Krahenbuhl | G06F 3/0416 345/156 |
| 2013/0078976 | A1* | 3/2013 | Naftolin | H04M 1/72569 455/418 |
| 2013/0297926 | A1* | 11/2013 | Eaton | H04M 1/72569 713/100 |
| 2014/0043295 | A1 | 2/2014 | Alameh et al. | |
| 2014/0066124 | A1* | 3/2014 | Novet | H04M 1/72569 455/556.1 |
| 2015/0237183 | A1* | 8/2015 | Novet | H04M 1/72569 455/556.1 |
| 2015/0302728 | A1* | 10/2015 | Gettings | G08B 29/181 340/506 |
| 2017/0011613 | A1* | 1/2017 | Iio | G08B 21/088 |

FOREIGN PATENT DOCUMENTS

| | | |
|---|---|---|
| CN | 102761669 A | 10/2012 |
| CN | 102938820 A | 2/2013 |
| CN | 103620534 A | 3/2014 |
| CN | 104255019 A | 12/2014 |
| CN | 105100469 A | 11/2015 |
| EP | 1109382 A2 | 6/2001 |

* cited by examiner

MOBILE DEVICE COMPRISING MULTIPLE SENSORS FOR CONTROLLING FUNCTIONAL OPERATIONS

TECHNICAL FIELD

Embodiments of the present disclosure relate to a mobile device and a control method thereof.

BACKGROUND

In nowadays with a fast pace of life and developed science and technology, with coming of an era of smart mobile devices, more and more mobile devices employ an intelligent scientific and technological equipment, and whether a portable music listening device or a touch display product, they have come to reality; various kinds of information may be accessed anytime and anywhere by a smart mobile device; everyone is familiar with a mobile device, such as a portable computer and a smart mobile phone, and various needs of a user can be met anytime and anywhere.

With increasing demands of people, a function of the mobile device becomes more and more complex; a more beautified interface, a simpler and faster operation, a more convenient control and more intelligent perceptual processing are constantly pursued; generally, in order to realize various intelligent functions, the mobile device needs to install a sensor for perceiving all kinds of information from outside; as a tool for acquiring the information of the mobile device, the sensor is like "eyes", a "nose" and "ears" of the mobile device; a sensor technology is a key technology for realizing perception, and can realize intelligent perception, recognition and management in a function realization process of the mobile device.

The mobile device can meet a need that the user enjoys various convenient and fast functions anytime and anywhere, and therefore, the mobile device needs to work under various different external environments; however, as the mobile device cannot automatically switch its working mode, damage to the mobile device or inconvenience use can be easily caused sometimes. For example, the user puts the smart mobile phone on a wooden table or chair, if the mobile phone activates a vibration mode, the mobile phone is easy to fall off due to a vibration to cause damage. And for another example, the user uses the mobile phone in an environment with weak light, and as the mobile phone cannot perceive ambient light itself, and cannot automatically increase brightness, which causes the inconvenience in use of the user.

SUMMARY

An embodiment of the present disclosure provides a mobile device, including a functional body, a detecting module, a determining module, a controlling module and a storing module, wherein the storing module is configured for pre-storing reference data for a plurality of characteristic parameters, wherein the reference data for each of the characteristic parameters indicate types of substances, respectively; the detecting module is configured for detecting one of the characteristic parameters of a substance in contact with the functional body of the mobile device so as to obtain a detection data for the one of the characteristic parameters; the determining module is configured for comparing the detection data for the one of the characteristic parameters obtained by the detecting module with the reference data for the corresponding characteristic parameters pre-stored in the storing module, so as to determine a type of the substance in contact with the functional body of the mobile device; the controlling module is configured for controlling the functional body of the mobile device to activate a corresponding working mode according to the type of the substance determined by the determining module.

In an example, the functional body of the mobile device has a plurality of working modes; and the controlling module controls the functional body of the mobile device to activate a corresponding working mode, which includes:

if a first priority working mode of the mobile device which is to be correspondingly activated by the controlling module of the mobile device, according to the type of the substance in contact with the functional body of the mobile device which is determined by the determining module, is set to be prohibited by a user, then a second priority working mode of the functional body of the mobile device is correspondingly activated by the controlling module.

In an example, the plurality of characteristic parameters pre-stored in the storing module includes:

at least one of vibration frequency, dielectric constant, light intensity, humidity and hardness indicating type of substance.

In an example, the detecting module is a sensor.

In an example, the detecting module includes a plurality of sensors.

In an example, the detecting module includes a capacitive proximity sensor configured for detecting pressure, displacement, vibration frequency and liquid level of substance.

In an example, the detecting module includes a photosensitive sensor configured for detecting intensity of ambient light.

In an example, the detecting module includes a touch sensor configured for detecting deformation and temperature of substance.

An embodiment of the present disclosure provides a control method for a mobile device, reference data for a plurality of characteristic parameters being pre-stored in a storing module of the mobile device, wherein, the reference data for each of the characteristic parameters indicate types of substances respectively, and the control method comprises:

detecting one of the characteristic parameters of a substance in contact with a functional body of the mobile device so as to obtain detection data for the characteristic parameter;

comparing the detection data for the characteristic parameter obtained by a detecting module with reference data for corresponding characteristic parameter pre-stored in the storing module, so as to determine the type of the substance in contact with the functional body of the mobile device;

controlling the mobile device to activate a corresponding working mode according to the determined type of the substance in contact with the mobile device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

The technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

An embodiment of the present disclosure provides a mobile device, so that a user can enjoy a more intelligent mobile device. When the mobile device provided by the embodiment of the present disclosure is applied to different environments, different ambient environments can be perceived by a sensor, and then the mobile device is intelligently controlled to work under different modes.

Figure 1:
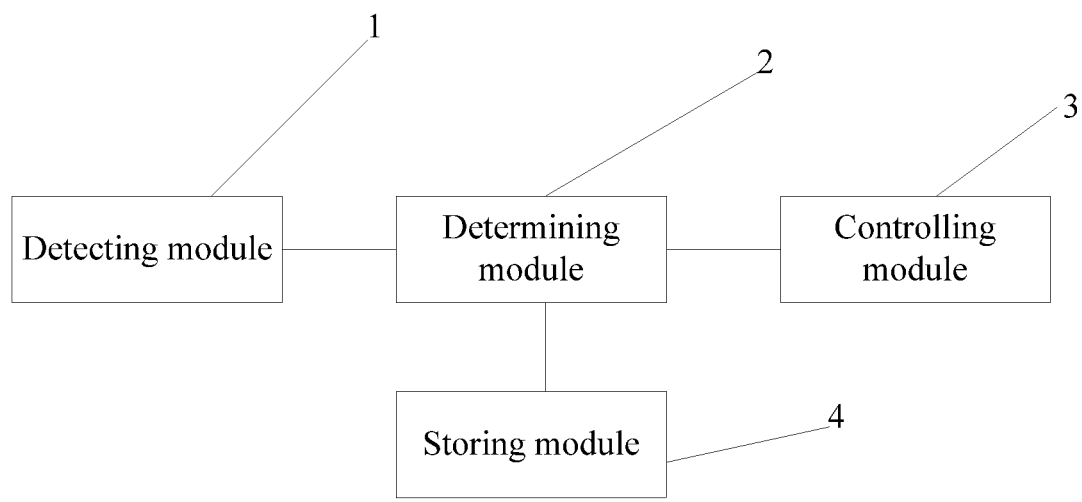
FIG. 1 is a block diagram of a mobile device provided by an embodiment of the present disclosure.

An embodiment of the present disclosure provides a mobile device, as shown in FIG. 1, the mobile device can include: a detecting module 1, a determining module 2, a controlling module 3 and a storing module 4.

The storing module 4 is configured for pre-storing reference data for a plurality of characteristic parameters, wherein reference data for each characteristic parameter indicate types of substance respectively;

The detecting module 1 is configured for detecting one of the characteristic parameters of a substance in contact with the functional body of the mobile device so as to obtain detection data for the characteristic parameter;

The determining module 2 is configured for comparing the detection data for the characteristic parameter obtained by the detecting module with the reference data for the corresponding characteristic parameter pre-stored by the storing module 4, so as to determine the type of the substance in contact with the functional body of the mobile device;

The controlling module 3 is configured for controlling the functional body of the mobile device to activate a corresponding working mode, according to the type of the substance determined by the determining module 2.

In the above-described mobile device provided by the embodiment of the present disclosure, for example, the storing module 4 is configured for pre-storing reference data for a plurality of characteristic parameters, wherein the reference data for each characteristic parameter indicate types of substance respectively; the detecting module 1 is configured for detecting one of the characteristic parameters of the substance in contact with the functional body of the mobile device so as to obtain the detection data for the characteristic parameter; the determining module 2 is configured for detecting one of the characteristic parameters of the substance in contact with the functional body of the mobile device so as to obtain the detection data for the characteristic parameter; the controlling module 3 is configured for controlling the functional body of the mobile device to activate a corresponding working mode according to the type of the substance determined by the determining module 2, and thus the mobile device can activate different working modes according to the different detected ambient environments correspondingly. For example, when detecting that a substance in contact with the functional body of the mobile device is a wood, the mobile device determines that it is placed on a table or a chair at the moment, and may disable a vibration function, to prevent itself from falling off the table due to its vibration; when detecting that a substance in contact with the functional body of the mobile device is a human body, the mobile device activates the vibration function so as to facilitate a user using it; when detecting that a substance in contact with the functional body of the mobile device is liquid, the mobile device may activate an automatic power-off mode rapidly, so as to prevent the mobile device from being damaged due to immerging into the liquid. As it is realized that when the mobile device is applied to different environments, the mobile device is controlled to work in different modes by detecting the different ambient environments, which not only can protect the mobile device from accidental damage, but also enables the user to enjoy more intelligent services of the mobile device.

For example, in the above-described mobile device provided by the embodiment of the present disclosure, the functional body of the mobile device may have various working modes, and the controlling module controls the functional body of the mobile device to activate the corresponding working mode, which, for example, may include: if a first priority working mode of the mobile device which is to be correspondingly activated by the controlling module of the mobile device according to the type of the substance in contact with the functional body of the mobile device which is determined by the determining module is set to be prohibited by a user, then a second priority working mode of the functional body of the mobile device is correspondingly activated by the controlling module. For example, in the above-described mobile device provided by the embodiment of the present disclosure, the mobile device has a variety of working modes, for example the mobile device is a mobile phone, and the mobile phone has working modes of ringing, vibration, silence, etc. During a conference, in order to avoid influencing the conference, a user may turn off the ringing of the mobile phone, and sets it in a vibration mode. However, when it is detected by the detecting module that the mobile device is placed on a wooden table or chair, in order to prevent the mobile device from falling off due to its vibration, the mobile device may be controlled by the controlling module to disable the vibration mode and choose to activate a ringing mode, and however, because the ringing mode is set to be prohibited by a user so as to avoid influencing the conference, the controlling module may control the mobile device to choose to activate a silence mode of a second priority. For example, the mobile device may be provided with working modes of a plurality of priorities, and the controlling module correspondingly controls the mobile device to optionally activate a corresponding working mode from a high priority to a low priority in sequence, so that the working mode of the mobile device is in line with an environment where the mobile device is located at that time, and the user enjoys more intelligent services.

For example, in the above-described mobile device provided by the embodiment of the present disclosure, the detecting module may include: an collection unit and a conversion unit, wherein the collection unit is configured for collecting the characteristic parameter of the substance in contact with the mobile device; the conversion unit is configured for converting the characteristic parameter of the substance in contact with the mobile device which is collected by the collection unit into characteristic data for characterizing the type of the substance.

For example, in the above-described mobile device provided by the embodiment of the present disclosure, the detecting module is configured for detecting an ambient environment where the mobile device is located. The type of the substance in contact with the mobile device needs to be detected. And, the mobile device can correspondingly activate different working modes according to a detection result. For example, a detection process may be that: the type of the substance is detected by detecting an inherent characteristic parameter of the substance, i.e., the inherent characteristic parameter of the substance is collected by the collection unit, and then the characteristic parameter for characterizing the type of the substance is converted into a data signal that may be recognized by the mobile device by the conversion unit, then the mobile device can recognize the type of the substance in contact with the mobile device, and correspondingly activates the different working modes optionally. Therefore, not only the mobile device can be protected from accidental damage, but also the user is enabled to enjoy more intelligent services of the mobile device.

For example, in the above-described mobile device provided by the embodiment of the present disclosure, pre-storing reference data for the plurality of characteristic parameters for indicating types of substance in the storing module, may include: at least one of vibration frequency, dielectric constant, light intensity, humidity and hardness for indicating the type of the substance. For example, in the above-described mobile device provided by the embodiment of the present disclosure, the type of the substance is determined according to the detection data for the characteristic parameter of the type of substance. The characteristic parameters for indicating types of substance stored in the mobile device are not limited to the above-described several types, and may further include other characteristic parameters for indicating types of substance, for example, the substance's liquidity parameter, air pressure, PH value, smell and so on. By comparing the stored reference data for the plurality of characteristic parameters of various types of substances, the type of the substance in contact with the functional body of the mobile device may be determined, and then the mobile device may correspondingly activate different working modes according to a detection result, which not only can protect the mobile device from accidental damage, but also enables a user to enjoy more intelligent services of the mobile device.

For example, in the above-described mobile device provided by the embodiment of the present disclosure, detection on an ambient environment substance is realized by the detecting module, for example, a corresponding function can be realized by adopting a sensor, i.e., the detecting module can be a sensor. For example, in the above-described mobile device provided by the embodiment of the present disclosure, detection on the substance in contact with a functional body of the mobile device may be realized through a sensor technology. For example, a vibration sensor may be adopted, and a function of the vibration sensor is to receive a mechanical quantity, and proportionally convert into an electric quantity. As the vibration sensor is also an electromechanical conversion device, so the vibration sensor is also called a transducer, a vibration pickup and the like.

Figure 2:
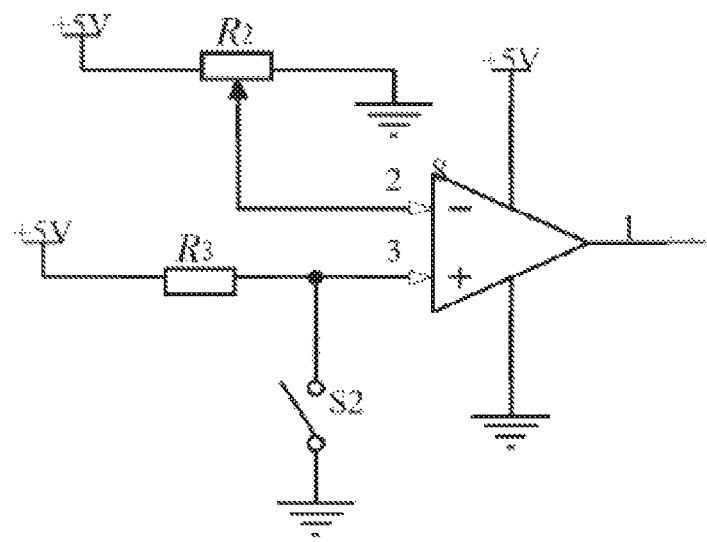
FIG. 2 is a schematic diagram of working principle of a vibration sensor provided by an embodiment of the present disclosure.

For example, instead of directly converting a mechanical quantity that needs to be originally measured into an electric quantity, the vibration sensor takes the mechanical quantity that needs to be originally measured as an input quantity of the vibration sensor, then the mechanical quantity is received by a mechanical receiving part, so as to form another mechanical quantity that is suitable for being converted, and finally, the another mechanical quantity is converted into the electric quantity by an electromechanical conversion part. Therefore, working performance of a vibration sensor is realized by working of the mechanical receiving part and the electromechanical conversion part. For example, a working schematic diagram of the vibration sensor is as shown in FIG. 2, and is identical with that of an existing vibration sensor, which is not described in detail here.

In addition, as mechanical motion is a basic form of physical movement, a vibration can be measured by using a mechanical method; a sensor for testing a vibration frequency of the substance is also a common sensor, for example, a mechanical vibration analyzer (such as a Geiger vibration analyzer). A mechanical receiving principle of the vibration sensor is established on this basis. A working principle of receiving of a relative vibration analyzer is that during measurement, an instrument is fixed on a fixed support, a feeler lever is consistent with a measured object in vibration direction, and is in contact with a surface of the measured object by an elastic force of a spring. When the object vibrates, the feeler lever can move together with it, and pushes a recording pen holder to describe a curve that displacement of the vibrating object varies along with time on a moving paper tape. Parameters, such as magnitude of the displacement and frequency, may be calculated according to the recorded curve.

Thus it can be seen that, a result measured by a relative mechanical receiving part is a relative vibration of the measured object with respect to a reference body, and only when the reference body is absolutely motionless, an absolute vibration of the measured object can be measured; however, there will be a problem that, when the absolute vibration needs to be measured, but a motionless reference point cannot be found, such instrument is useless. For example, a vibration of a diesel locomotive is tested on a running diesel locomotive, and a vibration of ground and a building is measured during an earthquake, there is no an absolutely motionless reference point. In these cases, measurement needs to be performed by adopting a vibration analyzer of another measurement way, i.e., an inertial vibration analyzer; when measuring a vibration, the inertial vibration analyzer is directly fixed on a measuring point of a measured vibrating object, when a shell of the vibration analyzer moves with the measured vibrating object, relative motion will occur between an elastically supported inertia mass block and a shell, then a recording pen installed on the mass block may record an amplitude of relative vibration displacement between a mass component and the shell, and then an absolute vibration displacement waveform of the measured object can be obtained by utilizing a relationship of the relative vibration displacement between the inertia mass block and the shell.

In this way, whether the relative vibration analyzer or the inertial vibration analyzer is adopted to detect a vibration frequency of the substance, the vibration frequency of the substance can be obtained, thereby determining types of substance, i.e., the detecting module in the mobile device can detect an inherent frequency of the substance by adopting various vibration sensors (or accelerometers), thereby obtaining the inherent frequency for indicating types of the substance, and then the inherent frequency is compared with pre-stored reference data for the vibration frequency for indicating the type of the substance to determine a type of a substance. For example, the mobile device determines that the substance in contact with the functional body of the mobile device is a wood by detecting the vibration frequency of the substance, then the mobile device recognizes that itself is placed on a table or a chair, etc., and may disable a vibration function, so as to prevent the mobile device from falling off the table due to its vibration. Thus, the mobile device can be prevented from accidental damage.

For example, in the above-described mobile device provided by the embodiment of the present disclosure, in order to realize detection on various substances, the mobile device can include one or more sensors, i.e., different types of substances may be detected by different types of sensors. For example, if an inherent frequency of the substance needs to be detected, the vibration sensor may be adopted for detection; if illumination intensity needs to be detected, a photosensitive sensor may be adopted for detection; if it is required to detect whether there is liquid in an ambient environment where the substance is located or not, a humidity sensor may be adopted for detection. Thus, various substances may be detected by adopting various sensors, which will not be limited here.

Figure 3A:
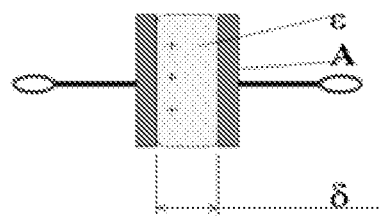
FIG. 3a and FIG. 3b are schematic diagrams of a working principle of a capacitive proximity sensor provided by an embodiment of the present disclosure.
Figure 3B:
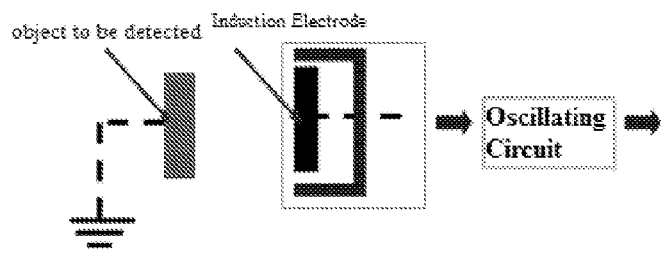

For example, in the above-described mobile device provided by the embodiment of the present disclosure, the detecting module may include a capacitive proximity sensor which is configured for detecting pressure, displacement, vibration frequency and liquid level of substance. For example, a detection component of the capacitive proximity sensor consists of an electrostatic capacitor and a high-frequency oscillator, the electrostatic capacitor takes a detection end and grounding as two poles. As shown in FIG. 3, a certain capacitance is formed between the detection electrode and the ground, i.e., the capacitance $C=\epsilon_0 \epsilon A/\delta$, where $\epsilon_0$ is a vacuum dielectric constant, $\epsilon$ is a relative dielectric constant, A is an area of an electrode plate, and $\delta$ is a distance between two electrode plates; when approaching the detection electrode, an object to be detected produces a polarization phenomenon under an influence of a voltage variation on the detection electrode; the closer the object to be detected approaches the detection electrode, the more obvious an electric charge varying quantity on the detection electrode occurs; because the capacitance and an electric charge of the detection electrode are directly proportional, the capacitance of the detection electrode changes accordingly, an oscillating circuit changes in oscillation frequency and even stop oscillates; an oscillation frequency variation and oscillation stop of the oscillating circuit are converted into corresponding digital signals to be output by a detection circuit. For example, as shown in FIG. 3, a measuring head including an induction electrode forms a polar plate of the capacitor, and another polar plate is the object to be measured itself; when the object moves to the measuring head, a dielectric constant between the object and the measuring head varies, and the oscillating circuit connected with the measuring head accordingly change, thus outputting a corresponding digital signal, and detection data for the characteristic parameter for indicating the detected substance can be obtained.

For example, in the above-described mobile device provided by the embodiment of the present disclosure, the detecting module may include a photosensitive sensor configured for detecting intensity of light. For example, the photosensitive sensor may be a photoelectric tube, a photomultiplier tube, a photoresistor, a phototriode, a solar cell, an infrared sensor, an ultraviolet sensor, an optical fiber-type photoelectric sensor, a color sensor, a CCD, a CMOS imaging sensor and the like; the photosensitive sensor is one of sensors widely applied at present, and it plays an important role in an automatic control and non-electrical quantity measurement technology; the photosensitive sensor is a sensor configured for converting a photosignal into an electric signal by utilizing a photosensitive component; the photosensitive sensor is not only limited to detecting light, but also may serve as a detection component to form other sensors; numerous non electrical quantities can be detected by only converting the non electrical quantities into variations of photosignal. For example, the photosensitive sensor can be applied to the detecting module of the mobile device provided by the embodiment of the present disclosure, so that the detecting module can detect intensity of ambient light, and then the mobile device is controlled corresponding to the intensity of the environment light to activate working modes corresponding to background light different in intensity, and thus a user can conveniently use the mobile device under the ambient light different in intensity, and meanwhile power consumption of the mobile device can also be reduced.

For example, in the above-described mobile device provided by the embodiment of the present disclosure, the mobile device can includes a touch sensor configured for detecting deformation and temperature of substance. For example, the touch sensor may simulate various perceptive modes of a human fingertip to feel variations of deformation, vibration, temperature of substance. For example a robot provided with such sensor may distinguish glass from metal; such sensor may also be adopted by an artificial limb, and of course, may also be arranged on the mobile device to detect different substances. For example, when the mobile device detects that pressure generated by the substance in contact with it exceeds a preset numerical value, i.e., the detected deformation of the substance exceeds the preset numerical value, an alarm working mode is activated, to inform a user that the mobile device is subjected to very high pressure, and needs to be transferred to another working place.

Only simple examples are listed above. In other examples, corresponding working mode can be set with respect to working environment and working place of the mobile device, and the mobile device activates the corresponding working modes for different environments, so that the mobile device offers more intelligent services for a user, is protected from accidental damage.

Figure 4:
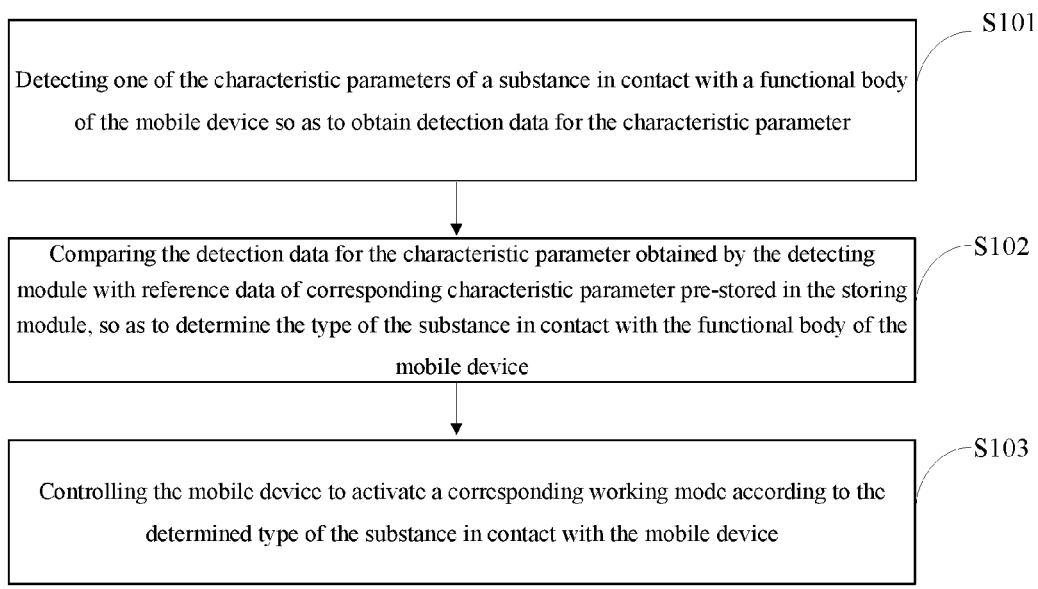
FIG. 4 is a flow diagram of a control method for a mobile device provided by an embodiment of the present disclosure.

Based on a same inventive concept, an embodiment of the present disclosure provides a control method for the mobile device provided by the above-described embodiment of the present disclosure; multiple reference data for a plurality of characteristic parameters are pre-stored in a storing module of the mobile device, wherein reference data for each characteristic parameter indicates a type of a substance respectively. The control method, as shown in FIG. 4, may comprise:

S101: detecting one of the characteristic parameters of a substance in contact with a functional body of the mobile device so as to obtain detection data for the characteristic parameter;

S102: comparing the detection data for the characteristic parameter obtained by the detecting module with the reference data for corresponding characteristic parameter pre-stored in the storing module, so as to determine the type of the substance in contact with the functional body of the mobile device;

S103: controlling the mobile device to activate a corresponding working mode according to the determined type of the substance in contact with the mobile device.

For example, in the control method for the above-described mobile device provided by the embodiment of the present disclosure, according to the collected characteristic parameter of the substance in contact with the mobile device, the detection data for the characteristic parameter for indicating the type of the substance in contact with the mobile device is obtained; the obtained detection data for the characteristic parameter is compared with the pre-stored reference data for the corresponding characteristic parameter, the type of the substance in contact with the mobile device is determined; according to the determined type of the substance in contact with the mobile device, the mobile device is controlled to activate the corresponding working mode. Therefore, the mobile device may correspondingly activate different working modes according to different detected ambient environments. For example, when detecting that a contact substance is a wood, the mobile device recognizes that it is placed on a table or a chair, etc., and will disable a vibration function, so as to prevent the mobile device from falling off the table due to its vibration; when detecting that a contact substance is a human body, the mobile device activates a vibration function so as to facilitate a user in using it; when detecting that a substance around the mobile device is a liquid, the mobile device may rapidly activate an automatic power-off function, so as to prevent the mobile device from being damaged due to immerging into the liquid. Thereby, when being applied to different environments, the mobile device is controlled to work in different modes by perceiving different ambient environments. Accordingly, not only can the mobile device be prevented from accidental damage, but also a user can enjoy more intelligent services of the mobile device.

For example, in the control method for the above-described mobile device provided by the embodiment of the present disclosure, the step S102, for example, may include: collecting a characteristic parameter of the substance in contact with the mobile device; converting the collected characteristic parameter of the substance in contact with the mobile device into a data signal for indicating the type of the substance. In order to realize that different working modes are correspondingly activated when the mobile device is in different environments, an ambient environment where the mobile device is located needs to be detected, especially the type of the substance in contact with the mobile device needs to be detected, and then the mobile device may correspondingly activate the different working modes according to a detection result. For example, a detection process may be: by detecting an inherent characteristic of the substance, the type of the substance can be detected, i.e., by collecting an inherent characteristic parameter of the substance, and converting the characteristic parameter for indicating the type of the substance into a data signal that can be recognized by the mobile device, the mobile device may recognize the type of the substance in contact with it, and different working modes are correspondingly activated optionally. Thus, not only can the mobile device be prevented from accidental damage, but also a user can enjoy more intelligent services of the mobile device.

An embodiment of the present disclosure provides a mobile device and a control method, the mobile device comprising: a detecting module, a determining module, a controlling module and a storing module, wherein, the storing module is configured for pre-storing reference data for a plurality of characteristic parameters, wherein reference data for each characteristic parameter indicates types of substance respectively; the detecting module is configured for detecting one of the characteristic parameters of a substance in contact with a functional body of the mobile device so as to obtain detection data for the characteristic parameter; the determining module is configured for comparing the detection data for the characteristic parameter obtained by the detecting module with the reference data for the corresponding characteristic parameter pre-stored in the storing module, so as to determine the type of the substance in contact with the functional body of the mobile device; the controlling module is configured for controlling the functional body of the mobile device to activate a corresponding working mode according to the type of the substance determined by the determining module. Thus, the mobile device can correspondingly activate different working modes according to different detected ambient environments. For example, when detecting that a substance in contact with the functional body of the mobile device is a wood, the mobile device recognizes that it is placed on a table or a chair, etc., and will disable a vibration function, so as to prevent the mobile device from falling off the table due to its vibration; when detecting that a substance in contact with the functional body of the mobile device is a human body, the mobile device activates a vibration function so as to facilitate a user in using it; when detecting that a substance in contact with the functional body of the mobile device is a liquid, the mobile device may activate an automatic power-off mode rapidly, so as to prevent the mobile device from being damaged due to immerging into the liquid. Thereby, when being applied to different environments, the mobile device is controlled to work in different modes by perceiving different ambient environments, which not only can protect the mobile device from accidental damage, but also enables a user to enjoy more intelligent services of the mobile device.

Although the embodiment of the disclosure has been described above in great detail with general descriptions and specific embodiments, on the basis of the embodiment of the disclosure, various changes and improvements may be made, which is apparent to those skilled in the art. Therefore, all such changes and improvements without departing from the spirit of the disclosure are within the scope of the claims of the disclosure.

The present application claims priority of Chinese Patent Application No. 201510432436.2 filed on Jul. 21, 2015, the present disclosure of which is incorporated herein by reference in its entirety as part of the present application.

The invention claimed is:

1. A mobile device, comprising a functional body, a detecting module, a determining module, a controlling module and a storing module, wherein,
   the storing module is configured for pre-storing reference data for a plurality of characteristic parameters, wherein the reference data for each of the plurality of characteristic parameters indicate types of substances, respectively;
   the detecting module is configured for detecting one of the plurality of characteristic parameters of a substance in said substances in contact with the functional body of the mobile device so as to obtain a detection data for the one of the characteristic parameters, wherein the characteristic parameters of the substance include pressure, displacement, vibration frequency and liquid level of the substance;
   the determining module is configured for comparing the detection data for the one of the plurality of characteristic parameters obtained by the detecting module with the reference data for a corresponding characteristic parameter pre-stored in the storing module, so as to determine the type of the substance in contact with the functional body of the mobile device;

the controlling module is configured for controlling the functional body of the mobile device to activate a vibration function mode if the type of the substance determined by the determining module is a human body.

2. The mobile device according to claim 1, wherein the functional body of the mobile device has a plurality of working modes; and the controlling module controls the functional body of the mobile device to activate a corresponding working mode in the plurality of working modes, which includes:

if a first priority working mode of the plurality of working modes of the mobile device which is to be correspondingly activated by the controlling module of the mobile device, according to the type of the substance in contact with the functional body of the mobile device which is determined by the determining module, is set to be prohibited by a user, then a second priority working mode of the functional body of the mobile device is correspondingly activated by the controlling module.

3. The mobile device according to claim 1, wherein, the plurality of characteristic parameters pre-stored in the storing module includes:

at least one of vibration frequency, dielectric constant, light intensity, humidity and a hardness indicating a type of a substance.

4. The mobile device according to claim 1, wherein, the detecting module is a sensor.

5. The mobile device according to claim 1, wherein, the detecting module includes a plurality of sensors.

6. The mobile device according to claim 5, wherein, the detecting module includes a photosensitive sensor configured for detecting intensity of ambient light.

7. The mobile device according to claim 5, wherein, the detecting module includes a touch sensor configured for detecting deformation and temperature of a substance of said substances.

8. The mobile device according to claim 2, wherein, the plurality of characteristic parameters pre-stored in the storing module includes:

at least one of vibration frequency, dielectric constant, light intensity, humidity and a hardness indicating a type of a substance.

9. The mobile device according to claim 2, wherein, the detecting module is a sensor.

10. The mobile device according to claim 3, wherein, the detecting module is a sensor.

11. The mobile device according to claim 8, wherein, the detecting module is a sensor.

12. The mobile device according to claim 1, wherein, the detecting module comprises a capacitive proximity sensor consisting of an electrostatic capacitor and a high-frequency oscillator, the electrostatic capacitor takes a detection end and a grounding as two poles.

13. A mobile device, comprising a functional body, a detecting module, a determining module, a controlling module and a storing module, wherein, the storing module is configured for pre-storing reference data for a plurality of characteristic parameters, wherein the reference data for each of the plurality of characteristic parameters indicate types of substances, respectively;

the detecting module is configured for detecting one of the plurality of characteristic parameters of a substance in said substances in contact with the functional body of the mobile device so as to obtain a detection data for the one of the characteristic parameters wherein the detecting module includes a capacitive proximity sensor configured for detecting pressure, displacement, vibration frequency and liquid level of the substance;

the determining module is configured for comparing the detection data for the one of the plurality of characteristic parameters obtained by the detecting module with the reference data for a corresponding characteristic parameter pre-stored in the storing module, so as to determine a type of the substance in contact with the functional body of the mobile device;

the controlling module is configured for controlling the functional body of the mobile device to activate an automatic power-off mode if the type of the substance determined by the determining module is liquid.

14. A control method for a mobile device, reference data for a plurality of characteristic parameters being pre-stored in a storing module of the mobile device, wherein, the reference data for each of the plurality of characteristic parameters indicate types of substances respectively, and the control method comprises:

detecting one of the plurality of characteristic parameters of a substance in said substances in contact with a functional body of the mobile device so as to obtain detection data for one of the plurality of characteristic parameters wherein the detecting module includes a capacitive proximity sensor configured for detecting pressure, displacement, vibration frequency and liquid level of the substance;

comparing the detected data for one of the plurality of characteristic parameter obtained by a detecting module with reference data for corresponding characteristic parameter pre-stored in the storing module, so as to determine the type of the substance in said substances in contact with the functional body of the mobile device;

controlling the mobile device to activate a vibration function mode if the determined type of the substance in said substances in contact with the mobile device is a human body.

* * * * *